April 8, 1930.  H. E. BRAGG  1,753,330
METERING DEVICE
Filed Sept. 22, 1928

INVENTOR
HERBERT E. BRAGG
BY John A. Hall
ATTORNEY

Patented Apr. 8, 1930

1,753,330

UNITED STATES PATENT OFFICE

HERBERT E. BRAGG, OF EAST ORANGE, NEW JERSEY, ASSIGNOR TO BELL TELEPHONE LABORATORIES, INCORPORATED, OF NEW YORK, N. Y., A CORPORATION OF NEW YORK

METERING DEVICE

Application filed September 22, 1928. Serial No. 307,756.

This invention relates to voltage indicating devices and more particularly to such devices as are employed to meter continuous and transient peak voltages.

In studying the effects of and remedying the evils produced by peak voltages it is highly desirable that a means for measuring and indicating such voltages be available and that such means be in the nature of a simple, compact structure, easily manipulated and accurately dependable. Heretofore, when investigating the phenomena of peak voltages it was necessary to set up an elaborate circuit arrangement involving the use of vacuum tubes and the capacitive and inductive variables exigent upon the use of such tubes, which resulted in a long, tedious series of tests and frequently terminated in false measurements.

It is the object of this invention to provide a compact, highly dependable portable device for indicating and measuring peak voltages, which may be quickly installed and readily adjusted to satisfy varying conditions.

This object is attained in accordance with a feature of the invention by utilizing the cathode glow of a gas filled discharge tube as a means for directly indicating the value of the voltage impressed on the anode-cathode circuit of the tube.

The invention contemplates the use of a calibrated tube or reservoir containing neon, argon or any other rare gas or combinations thereof, and having an annular anode at one end and a wire cathode extending the entire length of the tube and centrally located therein. The unknown potential is applied across the anode-cathode circuit through a relatively high constant series resistance and the length of the resulting cathode glow discharge along the central wire cathode indicates the value of the impressed voltage. The tube is calibrated to read directly in volts so that by merely securing the terminals of the tube to the terminals across which the voltage is to be measured, a direct reading in volts may be made.

Figure 1:
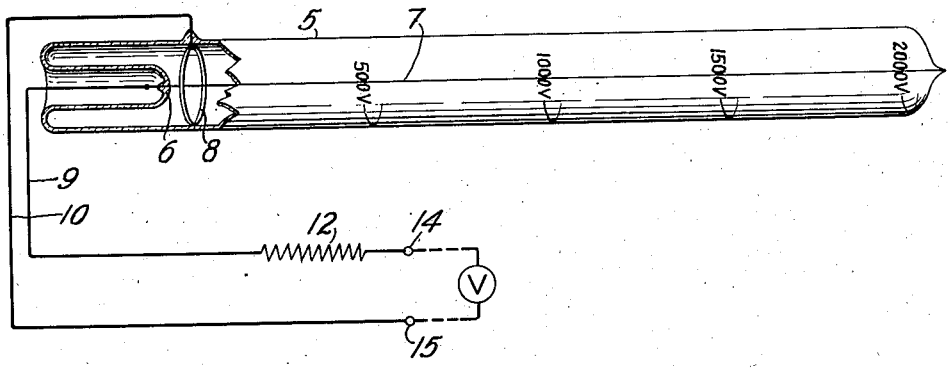
Figure 2:
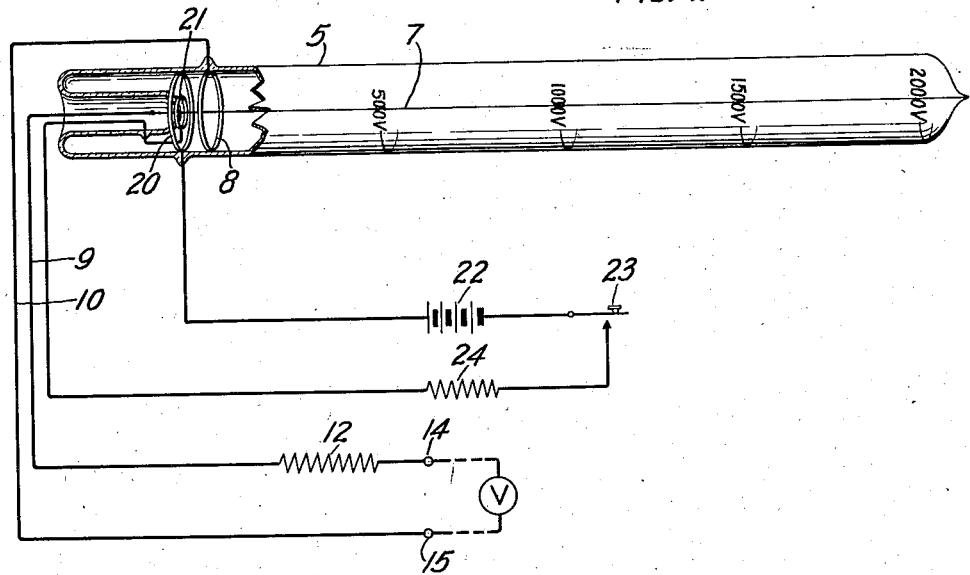

The invention will be readily understood from the following description made with reference to the accompanying drawings in which Fig. 1 is a two electrode gas filled discharge tube and Fig. 2 is a four electrode gas filled discharge tube, both of which involve the principles underlying this invention. Like numerals indicate similar elements throughout the drawings.

Referring to Fig. 1, a glass tube or reservoir 5 is provided with a re-entrant seal 6 through which one end of a cathode 7, preferably of fine nickel wire extends. The other end of the cathode 7 is sealed to the top of the glass tube 5 in any suitable manner and is so located that the cathode 7 assumes a position corresponding to the longitudinal axis of the tube. An annular anode 8, also preferably of nickel, is located near the base of the tube 5 and is secured thereto in any suitable manner. Lead-in wires 9 and 10 are provided for the cathode 7 and anode 8 respectively, and are adapted to be connected to an external circuit V, which represents an unknown voltage. A constant resistance element 12 of relatively high resistance compared to the impedance of the circuit producing the unknown voltage V, is connected in series with the cathode 7.

In operating, the terminals 14 and 15 of the lead-in wires 9 and 10 respectively, are connected to the terminals of the circuit producing the unknown voltage in any well known manner, whereupon the rare gas in the reservoir 5 ionizes and the cathode 7 assumes a glow due to the gaseous discharge, the length of glow on the cathode being a function of the voltage impressed across the anode-cathode circuit. It is believed unnecessary in this description to enter into the theory of the ionization of gases, as all phases of this phenomenon are well known to those skilled in the art. It may be well however, to note that a gas discharge tube of this type has what is generally known as a critical or breakdown voltage, so that for any voltage lower than this critical value no gas ionization takes place.

Depending upon the value of the voltage impressed on the anode-cathode circuit, the length of the glow along the cathode wire 7 varies and the glass tube 5 being calibrated in volts serves as a direct reading meter to indicate the value of the unknown voltage.

Referring to Fig. 2 it will be noted that an auxiliary pair of electrodes is furnished. These electrodes 20 and 21 are adapted to be energized from the direct current source 22 by the actuation of key 23.

In the operation of a gas discharge tube of the two electrode type as depicted in Fig. 1, there is an inherent lag in the ionization of the gas when the anode-cathode circuit is associated with a voltage supply. In measuring ordinary peak voltages this lag does not detract from the accurateness of the tube as a meter, but when transient voltages are to be measured, the length of the cathode glow would not be an exact indication of the impressed voltage owing to the fact that the transient voltage is not maintained sufficiently long to permit the gas to fully ionize and a correct reading to be taken. The auxiliary electrodes 20 and 21 accordingly, are furnished and a secondary current supply 22 is connected across their terminals through the resistance element 24. It is to be understood that the voltage impressed on the auxiliary electrodes is just below the critical or breakdown voltage of the tube. So that when a transient voltage is to be measured, the tube shown in Fig. 2 is employed and the key 23 is actuated to cause an initial gas ionization which overcomes the inherent lag. The same result may be accomplished by eliminating the auxiliary electrodes and connecting an external potential in series with the main anode or cathode in the proper direction, but of a value just below the breakdown voltage of the tube. In any case the unknown potential is a function of the length of the cathode glow and the tube can be calibrated to read directly in volts.

What is claimed is:

1. In combination a direct reading voltage indicator comprising a gas filled reservoir a pair of electrodes located therein, a calibrated scale on said reservoir, one of said electrodes constituting a central axis for said reservoir and means exclusive of said electrodes for producing an initial ionization of the gas in said reservoir.

2. In combination a direct reading voltage indicator comprising a gas filled reservoir, a pair of electrodes located therein, a calibrated scale on said reservoir, one of said electrodes constituting a central axis for said reservoir and a circuit including a pair of electrodes electrically independent of said first mentioned electrodes, for producing an initial ionization of the gas in said reservoir.

3. In combination, a direct reading voltage indicator comprising a gas filled calibrated reservoir, a pair of electrodes located therein, one of said electrodes constituting a central axis for said reservoir, a source of unknown voltage adapted to be impressed on said electrodes to cause ionization of the gas in said reservoir and produce a glow on one of said electrodes, the length of which is a function of the unknown voltage, a source of power having a terminal voltage less than the breakdown voltage of said gas filled reservoir and a pair of electrodes associated with said source of power and adapted to produce an initial ionization of the gas within said reservoir.

In witness whereof, I hereunto subscribe my name this 20th day of September, 1928.

HERBERT E. BRAGG.